United States Patent [19]

Booth

[11] 4,039,164
[45] Aug. 2, 1977

[54] PARACHUTE WITH MAIN CHUTE RELEASE DEPENDANT UPON PILOT CHUTE DEPLOYMENT

[76] Inventor: William Ross Booth, 2500 N. Woodland, Deland, Fla. 32720

[21] Appl. No.: 683,798

[22] Filed: May 6, 1976

[51] Int. Cl.² .................................................. B64D 17/40
[52] U.S. Cl. .................................... 244/148; 244/149
[58] Field of Search ................ 244/147, 148, 149, 152

[56] References Cited

U.S. PATENT DOCUMENTS

| 1,332,143 | 2/1920 | Osterday | 244/147 |
| 1,895,999 | 1/1933 | Kuhlemann | 244/148 |

FOREIGN PATENT DOCUMENTS

| 340,763 | 5/1936 | Italy | 244/149 |
| 1,221,548 | 2/1971 | United Kingdom | 244/149 |
| 1,221,790 | 2/1971 | United Kingdom | 244/147 |
| 301,162 | 11/1928 | United Kingdom | 244/148 |

Primary Examiner—Trygve M. Blix
Assistant Examiner—Charles E. Frankfort
Attorney, Agent, or Firm—Lester Horwitz

[57] ABSTRACT

This invention is an improvement in the art of parachutes. A parachute has a pilot chute and a main chute and provides that the main chute is locked in place and is not released until the pilot chute is properly deployed. This improvement may also provide for the actuating of the release of the main chute by the deployment of the pilot chute. This improvement in turns allows other improvements such as providing the individual parachutes with alternative mountings of the pilot chute for left and right handed people.

3 Claims, 4 Drawing Figures

PARACHUTE WITH MAIN CHUTE RELEASE DEPENDANT UPON PILOT CHUTE DEPLOYMENT

PRIOR ART

The usual present day parachute is contained in a pack on the jumper's back. This pack is attached to the jumper by means of a harness. The main chute is placed in the pack. In addition to the main chute there is a pilot chute, which has internal springs fastened to it (much like the metal ribs of an umbrella) which is then forcibly flattened against the main chute. There are four flaps on the parachute pack, one on either side of the pack, and one on the upper and lower end thereof. The flap that is folded down first has a cone with a hole through it. The other flaps have holes or grommets placed so that they are in position to have the cone go through the grommets upon closing the flaps. The flaps are on the free side of the parachute, that is away from the back of the jumper. These four flaps are then folded over the two chutes and the cones are placed through the grommets thereby locking the flaps. Offshoots or branches of a cable are then placed through the holes in the cones. The cable goes through a flexible housing to the front of the jumper where the cable is attached to a handle. When the jumper wishes his fall to be arrested he pulls on the handle. This in turn pulls the cable which pulls its attendent offshoots out of the holes in the cones. The pressure of the internal springs of the pilot chute then pushes against the four flaps. The flaps with the grommets are forced out and away from the flap with the cone and it in turn is pushed out by the pilot chute. In this fashion both chutes are released. Theoretically, the pilot chute then springs out into the free air stream and blossoms out due to the air being caught in it. The main chute which is attached to the pilot chute is then pulled up by the pilot chute and the deployment of the main chute thereby arrests the fall of the jumper.

The present day parachute has many disadvantages. The flexible tubing which contains the cable is adjustable for greater comfort but it is not completely adjustable so as to change from positioning for the comfort of a right handed person to being positioned for the comfort of a left handed person. In case of cable malfunction greater strength may be required to pull the cable and release the chutes. In such circumstances the left handed person is denied the use of his stronger hand in case of an emergency.

In the event the pilot chute does not become fully deployed in the free air stream there is a chance of the main chute becoming a streamer, i.e., a chute that never deploys. The fatal result of a streamer need not be further described. There are many reasons the chute may not fully deploy and become a streamer, the most likely of which is the tumbling of the jumper in the air. If the pilot chute has not blossomed immediately it will not tug the main chute up with it. In such an event, the main chute will just fall out of the container, as the main chute has been released along with the pilot chute. If the main chute is allowed to merely fall out of the pack it may get caught either in the flaps of the main chute pack or intertwined in the pilot chute with its many attendant cords and risers. Even assuming that everything goes correctly, there is a certain amount of time that passes from pulling the rip cord, and the deployment of the main chute. This time may vary from 2 to 6 seconds. Thus, in the event of an emergency, the faster the chute deploys the longer the time you have to arrest your fall and position yourself for a proper landing. The deployment of the prior art chutes takes from 2 to 6 seconds while the deployment of the present chute takes from 0.45 to 1.3 seconds.

BRIEF DESCRIPTION OF INVENTION

By contrast, in the present invention, the main chute is locked into the main chute housing and is not released nor can it be released, until the pilot chute is properly deployed. Accordingly there is no chance of the main chute just falling out of the container instead of being tugged up by the pilot chute. If the main chute is tugged out of the container by a properly deployed pilot chute and is not allowed to merely fall out of the pack, the chances of it becoming a streamer is greatly reduced. The present invention allows for the jumper to hold and adjust the pilot chute into the clear air stream away from the jumper should it fail to deploy immediately.

The present invention provides for the actual deployment of the pilot chute as the means to unlock the main chute. In the preferred embodiment the deployed pilot chute actually actuates the opening of the pack and the subsequent release of the main chute. This invention allows for packing of the parachute so that the jumper can initiate the deployment of the chute with the hand he planned for at the time of his packing the chute. The present invention also ensures that the main chute is not released until the pilot chute is properly deployed. The present invention need not have the umbrella type springed ribbing inside the pilot chute as there is no need for the pilot chute to spring out ahead of the main chute. The elimination of the pilot chute from within the main chute pack provides for a thinner, softer and more flexible pack. Such a pack is more convenient for a pilot who must sit in the cockpit for long periods of time, or for a sport parachutist, who wears both a main chute and an emergency chute.

OBJECTS

It is the object of this invention to provide for a parachute where the main chute is locked in place until the pilot chute is fully deployed.

It is also the object of this invention to provide for a parachute whereby the deployment of the pilot chute actuates the release of the main chute.

It is also the object of this invention to allow for the packing of the parachute so that the jumper can initiate the deployment of the parachute with the hand he choses at the time of packing.

It is also the object of this invention to ensure that the main chute is not released until the pilot chute is properly deployed.

It is also the object of this invention to provide for a thinner, softer and more flexible parachute pack with no umbrella type springed ribbing inside the pilot chute.

It is also the object of this invention to provide for a quickly deploying parachute.

How the foregoing and other objects are achieved is more fully described in the detailed description and the accompanying drawings, in which.

DETAILED DESCRIPTION

Figure 1:
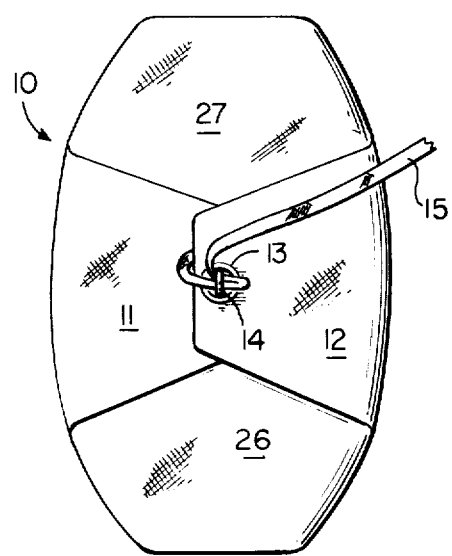
FIG. 1 is a rear view of the parachute pack.

In FIG. 1 there is shown a rear view of the parachute pack 10. The parachute pack 10 contains, in this embodiment, four flaps 11, 12, 26, 27. These flaps cover the main chute (not shown). The lowermost flap 26 contains cone 14. Flap 27, 11 and 12 also contain grommets through which the cone 14 projects. The topmost flap 12 contains a grommet 13 through which the forward portion of cone 14 projects when the flaps are fully folded with flap 12 on top. Pilot chute bridle cord 15, which connects the main chute to the pilot chute 16 (not shown in FIG. 1) is then put through a hole in the cone 14 securing the four flaps. This pilot chute bridle cord 15 being put through the hole in the cone 14 locks the main chute in place. The pilot chute bridle cord 15 is then placed around the body to the front side of the body facing the hand the user wishes to use to deploy the chute (see FIG. 2).

Figure 3:
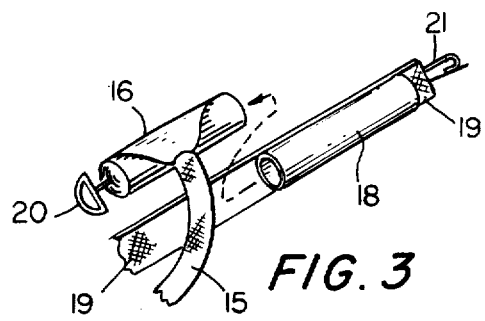
FIG. 3 is a view of the pilot chute being inserted into its container.

As shown in FIG. 3, the pilot chute 16 is rolled up with its attendant slack pilot chute bridle cord and placed inside the pilot chute container 18 on the belly band 19. As shown in FIG. 3, the rolled up pilot chute 16 and a portion of the pilot chute bridle cord 15 are placed in the container 18 on the belly band 19 with the buckle 21 so that the handle 20 protrudes out of container 18 and can be grasped.

Any fastening means (e.g., Velcro or snaps can be used to fasten the pilot chute container 18 to any portion of the parachute harness, for example, to straps 17 or 24 or for that matter it can be fastened anywhere on the front of the jumper for the jumpers convenience and for the jumper to have access to the pilot chute with either hand and at a position of maximum convenience to the jumper.

Figure 2:
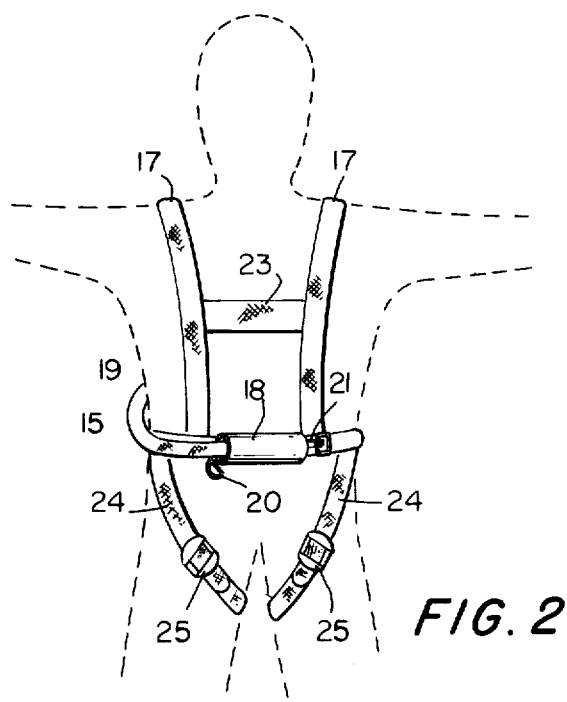
FIG. 2 is a front view of a user wearing the parachute.

In FIG. 2 there is shown the front of the user wearing the parachute (not shown). There is shown two main lift bands 17, a belly band 19, and a chest strap 23 and two leg straps 24. On the belly band 19 there is the container 18, with the pilot chute 16 and part of the pilot chute bridle cord 15 have been inserted therein and the handle 20 is hanging there to be pulled when desired. It is to be noted that the pilot chute bridle cord 15 can go around the waist from either side of the back, to be placed into the container 18 which can be placed in both directions on the belly band 19 of the jumper, so as to accept the pilot chute 16 with its attendant handle 20 being able to be pulled by either a right or left handed parachutist. In addition it should be noted that pilot chute bridle cord 15 could go over the shoulder to the front, instead of around the waist to the front. The positioning of the pilot chute container 18 may be on the belly band 19 or on the chest strap 23 or the leg straps 24 or anywhere within the grasp of the user either right or left handed. The container 18 need not be cylindrical, and in fact there need not be a container at all as long as there are means for holding or containing the pilot chute 16 folded up until its use is desired. It is to be noted that the essence of this invention is to provide for the deployment of the pilot chute prior to the release of the main chute. In the preferred embodiment the deployment of the pilot chute 16 is accomplished by the jumper by extending the pilot chute 16 into the free air stream. The pilot chute 16 is jerked out of the hand of the jumper or he releases same, and it is because the pilot chute 16 is now fully deployed that it pulls the pilot chute bridle cord 15 out of the hole in the cone which had in turn restrained thereunder the flaps. The further pulling out of the pilot chute 16 by the air stream then pulls out the main chute. It should be noted that the main chute can not be deployed unless the pilot chute 16 is pulling it out. This thus ensures full deployment with no main chute malfunction.

Figure 4:
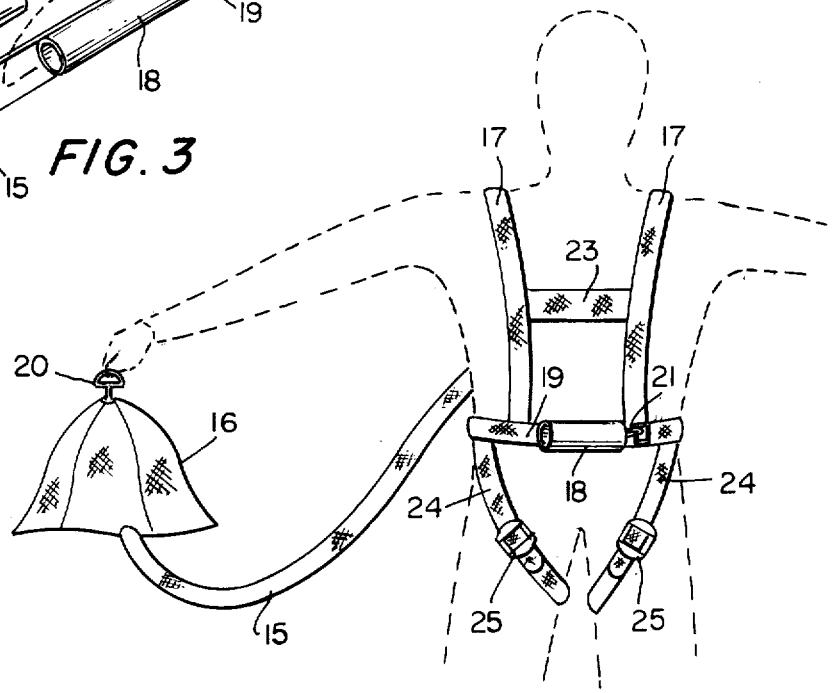
FIG. 4 is a front view of a user in the first step of deploying the parachute.

In FIG. 4 there is shown the first step in the release of the parachute. The user grasps the handle 20 and pulls the pilot chute 16 out of the container 18 and holds it loosely away from his body so it is in the free air stream (as opposed to the turbulent air stream near his body). The air is caught in the pilot chute 16 and as can be seen in FIG. 4 the pilot chute 16 is jerked out of the jumper's hand and blossoms forth pulling with it the pilot chute bridle cord 15. The pilot chute bridle cord 15 is pulled out of the hold in the cone 14 thereby unlocking the main chute by allowing the grommets to slip over the cone 14 and freeing the flaps. The pilot chute 16, still caught in the air stream, further continues its pull on the pilot chute bridle cord 15 and the main chute (not shown) is pulled out of the parachute pack 10 and there is now little chance of a streamer or other malfunction. The main chute is quickly pulled free from the pack 10 and will not get caught in the flaps, or in the pilot chute 16.

It is urged that in the preferred embodiment the blossoming of the pilot chute 16 actuates the release of the main chute. Any means whereby the blossoming of the pilot chute releases the main chute is encompassed by this invention.

Another improvement which is shown is a cinch 25 on the leg crotch strap 24. In the usual parachute, when the chute harness is put on, the user buckles up much as a seat belt in a car. This leaves the loose end of the strap dangling which can hit the user as he falls. In the present invention a cinch 25 is used to tighten the straps just as a cinch on the shoulder strap of a backpack is used and there is, therefore, no loose strap to hurt the user. As shown in FIGS. 2 and 4, there is one continuous body strap which is tightened by the one cinch 25 on each leg crotch strap 24.

The value of such a cinch strap is that there are less dangling loose straps to injure the user as he tumbles or to become entangled with the parachute and cause a streamer.

I claim:

1. In the art of parachutes comprising pilot and main chutes and means for releasing said chutes, the improvement wherein there is added locking means locking said main chute in place, said locking means being unlocked by the deployment of the pilot chute, said locking means comprising
   a. a pack attached to the back of a user and enclosing said main chute, said pack comprising flaps which have respectively, grommets and a core thereon, said core going through said grommets when said flaps are enclosing said main chute;
   b. said pilot chute is attached to said main chute by a bridle cord; and
   c. said bridle cord going through a hole in said core when said flaps are enclosing said main chute, whereby said main chute is locked in place; wherein there are also container means attached to the front of the user of the parachute, said pilot chute being small and fitable into said container means whereby it is also deployable with one hand.

2. The improvement of claim 1, wherein said container means is located so as to be easily accessible with either hand.

3. The improvement of claim 1, wherein said pilot chute bridle cord goes around the waist area of said user to get to the front of said user.

* * * * *